US006705218B2

(12) United States Patent
Rapp

(10) Patent No.: US 6,705,218 B2
(45) Date of Patent: Mar. 16, 2004

(54) METHOD AND APPARATUS FOR PRINTING A BEVERAGE LABEL HAVING A STATIC PART AND A VARIABLE PART

(75) Inventor: Carl J. Rapp, Mendon, NY (US)

(73) Assignee: The Jolt Company, Inc., Rochester, NY (US)

(*) Notice: Subject to any disclaimer, the term of this patent is extended or adjusted under 35 U.S.C. 154(b) by 56 days.

(21) Appl. No.: 10/128,399

(22) Filed: Apr. 23, 2002

(65) Prior Publication Data

US 2003/0116915 A1 Jun. 26, 2003

Related U.S. Application Data

(63) Continuation-in-part of application No. 10/028,016, filed on Dec. 20, 2001.

(51) Int. Cl.[7] .............................. B41F 17/00; B41J 5/30; G06F 15/00

(52) U.S. Cl. .......................... 101/35; 101/38.1; 400/61; 400/70; 400/76; 358/1.18; 358/1.9

(58) Field of Search .................... 101/35, 38.1; 400/61, 400/70, 76; 345/1.1, 156; 358/1.9, 1.18; 273/292

(56) References Cited

U.S. PATENT DOCUMENTS

| | | | | | |
|---|---|---|---|---|---|
| 4,939,674 | A | * | 7/1990 | Price et al. | 358/1.9 |
| 5,380,045 | A | * | 1/1995 | Comann | 283/70 |
| 5,525,383 | A | * | 6/1996 | Witkowski | 428/30 |
| 5,619,027 | A | * | 4/1997 | Ackley | 235/462.01 |
| 5,621,864 | A | * | 4/1997 | Benade et al. | 358/1.18 |
| 5,676,401 | A | * | 10/1997 | Witkowski et al. | 283/81 |
| 5,718,520 | A | * | 2/1998 | MacKay | 400/61 |
| 5,761,328 | A | * | 6/1998 | Solberg et al. | 382/113 |
| 5,811,781 | A | * | 9/1998 | Ackley | 235/462.01 |
| 5,813,538 | A | * | 9/1998 | Kaufman | 206/457 |
| 5,915,858 | A | * | 6/1999 | Wen | 400/61 |
| 5,939,700 | A | * | 8/1999 | Ackley | 235/462.01 |
| 5,991,515 | A | * | 11/1999 | Fall et al. | 358/1.15 |
| 6,135,654 | A | * | 10/2000 | Jennel | 400/61 |
| 6,327,801 | B1 | * | 12/2001 | Witkowski | 40/306 |
| 6,493,677 | B1 | * | 12/2002 | von Rosen et al. | 705/27 |
| 6,513,435 | B2 | * | 2/2003 | Detzner | 101/487 |
| 6,581,972 | B2 | * | 6/2003 | Nojima et al. | 283/81 |
| 6,594,927 | B2 | * | 7/2003 | Witkowski | 40/310 |
| 2003/0093171 | A1 | * | 5/2003 | Soehnlen | 700/117 |

* cited by examiner

*Primary Examiner*—Stephen R. Funk
*Assistant Examiner*—Wasseem H. Hamdan
(74) *Attorney, Agent, or Firm*—Stephen B. Salai, Esq.; Donna P. Suchy, Esq.; Harter, Secrest & Emery LLP

(57) ABSTRACT

One or more beverage container labels and the method for creating a first static part and a second variable part including printing the image on the label using a single pass. The printing apparatus having a computer with memory to store a first static portion of an image and a second variable portion of an image so that a rasterizer connected to the memory and combining the first static portion and the second variable portion can form an image for printing. The apparatus also has a printer connected to the rasterizer for printing the image on a label in one step.

7 Claims, 3 Drawing Sheets

METHOD AND APPARATUS FOR PRINTING A BEVERAGE LABEL HAVING A STATIC PART AND A VARIABLE PART

CROSS REFERENCE TO RELATED APPLICATIONS

This application is a continuation-in-part of application entitled BEVERAGE GAME, Ser. No. 10/028,016, filed Dec. 20, 2001.

FIELD OF INVENTION

This invention relates generally to beverage containers, and more particularly but not by way of limitation, to beverage containers and/or labels for beverage containers that include variable printed indicia to be used either alone, or in combination with other types of printed indicia such as static printing.

BACKGROUND OF INVENTION

Merchants and manufacturers have long used games of various sorts to promote their products and services. Most often, the purchaser of a product will be interested in the label in conjunction with the purchase. A very wide variety of interesting labels including those with popular images, are popular and their proliferation suggests that they are at least modestly successful in increasing the sales of products.

Beverages, particularly canned and bottled beverages, are sold in enormous quantities. Labels have long been associated with the sale of such beverages in the past, but all such labels known to the inventors have been based on printing an image over and over on all the labels for a certain product.

Virtually all of promotional approaches of this type are keyed to not changing the label, in fact the advertising firms insist on not changing the labels so that the product does not lose its purchaser base and purchaser recognition in the marketplace.

For these reasons plus cost considerations, the inventors do not know of the effective use of variable printing on beverage containers that involve both a static and variable part on the same label.

SUMMARY OF INVENTION

The present invention includes a beverage container with a label affixed thereto having a first static part and a second variable part including printing the image on the label using a single pass. The apparatus having a computer having memory to store a first static portion of an image and a second variable portion of an image so that a rasterizer connected to the memory and combining the first static portion and the second variable portion can form an image for printing. The apparatus also has a printer connected to the rasterizer for printing the image on a label in one step.

The printing method of the present invention can include printing a first side of the label using a static printing process, forming an image for printing a second side of the label such that the image has a fixed part and a variable part, rasterizing the image, printing the rasterized image on a second side of the label, printing a first side of a second label using the static printing process, retrieving the image for printing the second side of the label, changing the variable part, rasterizing the image and printing the rasterized image on the second side of the second label.

BRIEF DESCRIPTION OF DRAWINGS

In the detailed description of the preferred embodiments of the invention presented below, reference is made to the accompanying drawings in which.

DETAILED DESCRIPTION OF THE INVENTION

Figure 1:
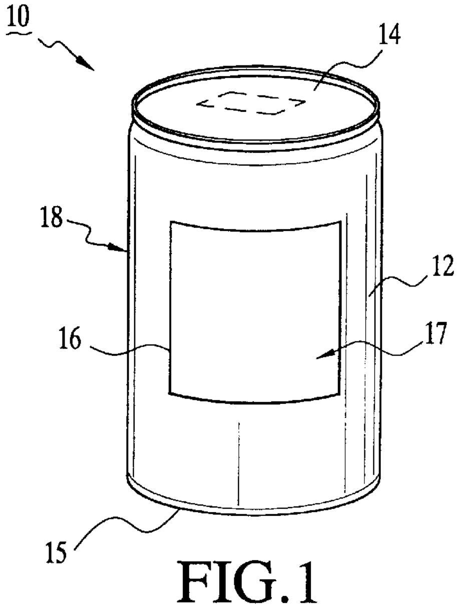
FIG. 1 is a view of a beverage container showing a first label.
Figure 2:
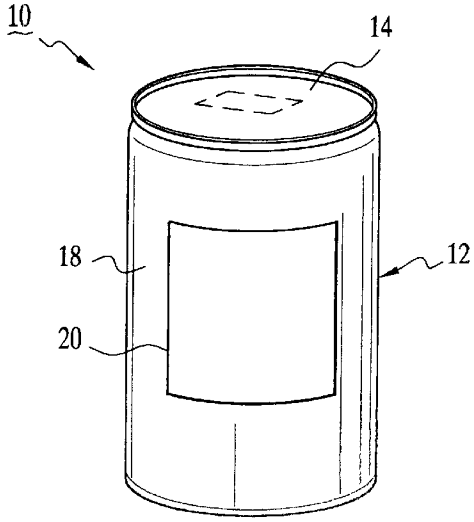
FIG. 2 is a second view of the beverage container showing a second label.

FIG. 1 shows a view of a container 10 in accordance with one embodiment of the present invention. The container 10 has a first side 12, a top 14 and a bottom 15. A label 16 with a printable surface 17 is affixed to the first side 12 of the container 10. The container 10 also has a second side 18. As shown in FIG. 2, the second side 18 of the container can have a second label 20.

Figure 3:
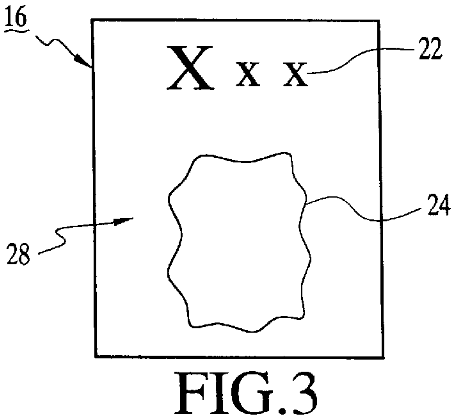
FIG. 3 is a detailed view of the first label.
Figure 4:
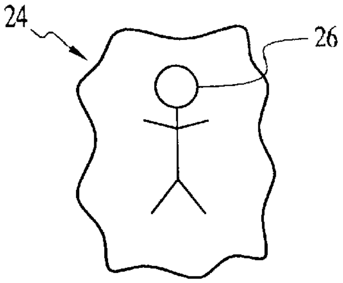
FIG. 4 is a detailed view of a portion of the first label.

FIG. 3 is an enlarged view of the label 16 having a static part 22 and a variable part 24 created by printing the image on the label using a single pass. These combined portions form the complete label. FIG. 4 shows the variable part 24 as some indicia 26 that happen to form an image of a person, possible a famous sports person that would vary from label to label 16. The combined static and variable portions that make up a single label are hereafter referred to as the variable printed label 28 as shown in FIG. 3.

Figure 5:
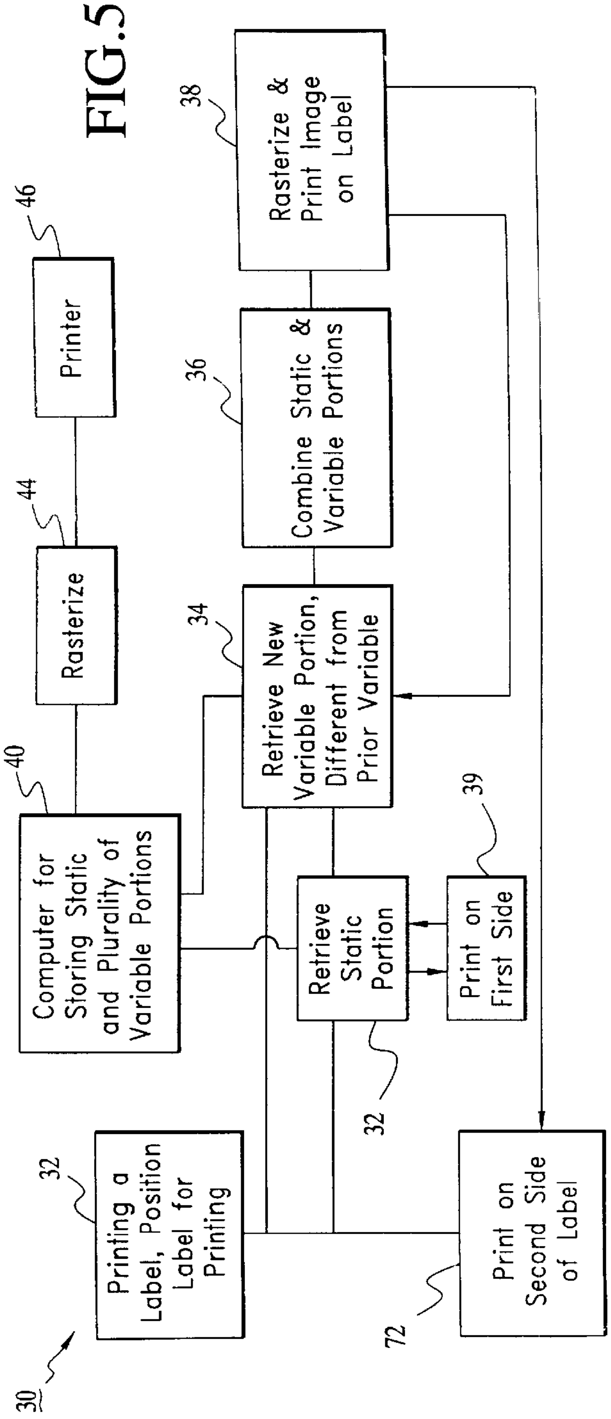
FIG. 5 is a flow chart showing the printing steps.

FIG. 5 shows a flow chart 30 that illustrates the printing method of the present invention. In order to print a variable printed label 28 according to the current invention a printable surface 17 is positioned for printing. Preferably a static portion of the image is first retrieved 32 from a source such as a computer. After the fixed or static portion of the image is selected a variable portion of the image is selected from the source 34 and the static and variable portions combined 36. The two portions are rasterized and the image is printed 38 on the printable surface 17. Each new printable surface 17 can receive a different variable part of the image before the image is rasterized and printed on the label 16.

In the above method the image including the static part and the variable part, are first rasterized and the rasterized image printed on the label using a single pass 38. A computer 40 stores the static image portion of the label and a plurality of variable image portions of the label, and combines the static portion of the label with one of the variable image portions of the label before printing the combined image on the label 16.

Apparatus of this invention includes the computer 40 having memory to store a first static portion of an image and a second variable portion of an image so that a rasterizer 44 connected to the memory and combining the first static portion and the second variable portion can form an image for printing. The apparatus also has a printer 46 connected to the rasterizer for printing the image on a label in one step.

Recent improvements in printing technology, specifically variable printing, make it possible to print these labels for beverage containers in larger quantities at a cost that manufacturers can afford using this method because the static portions of the label are stored with the variable portions. It is important to use the variable printing process or a similar printing process when preparing these labels, because the labels must vary from one to the other to make the labels vary from container to container.

Figure 6:
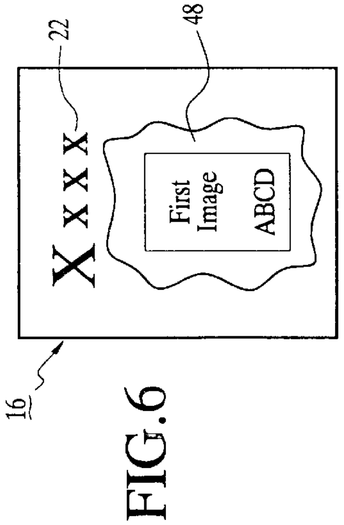
FIG. 6 is a detailed view of a portion of the first label with a first variable portion.
Figure 7:
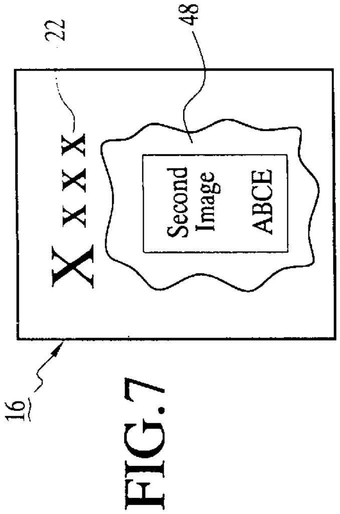
FIG. 7 is a detailed view of a portion of the first label with a second variable portion.

The variable printing technology uses a process where a set of indicia with components such as A, B, C and D are printed with one or more of the indicia varying with each incremental new label. For example, indicia A, B, C, D in a variable portion 48 shown in FIG. 6 would become ABCE, or ABCF in the variable portion, on a successive label shown in FIG. 7. The variable printing process continues to vary indicia one at a time while keeping the static portions constant on the label as each label is printed. This variable printing process allows each label to have unique indicia different from the indicia on the other containers in a set resulting in a large number of different container labels in any group of printed labels.

Figure 8:
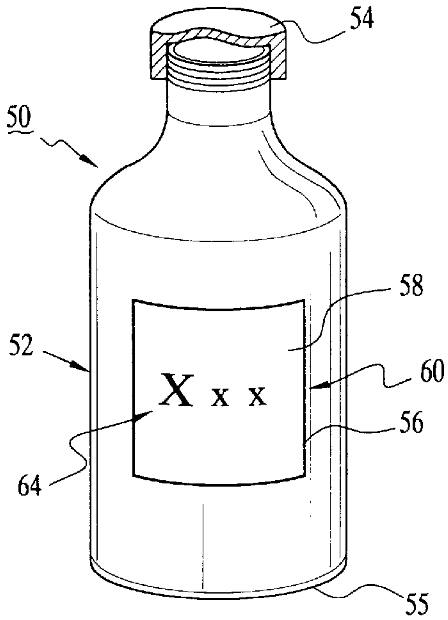
FIG. 8 is a view of a partially transparent container.

Another embodiment as shown in FIG. 8 works well a partially transparent container 50 that has a first side 52, a top 54 and a bottom 55. A label 56 on the container 50 has a printable surface 58 that is affixed to the first side 52 of the container 50. The label 56 also has a backside, also known as a second side 60.

Figure 9:
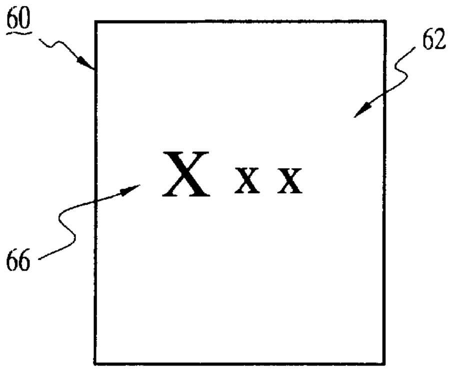
FIG. 9 is a detailed view of a portion of the second side of the label with a static portion.
Figure 10:
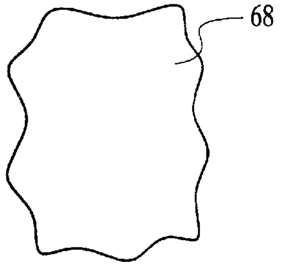
FIG. 10 is a detailed view of a portion of the label back with a variable portion.
Figure 11:
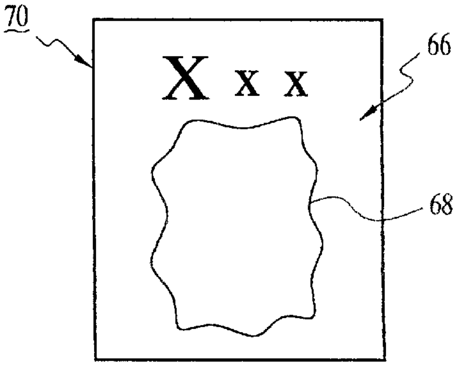
FIG. 11 is a detailed view of the label, including a static and a variable portion.
Figure 12:
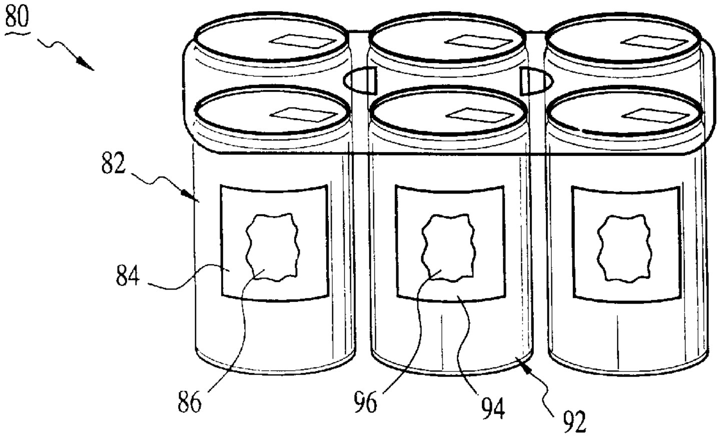
FIG. 12 is a plurality of containers.

As shown in FIG. 9, the second side 60 of the label 56 can have a second image 62. The method of the present invention retrieves and prints the static portion of the image 64 on a first side of the label, retrieves a static portion 66 and a variable portion 68 (shown in FIG. 10) of the image and combines these portions of the image 70 as shown in FIG. 11 before printing the rasterized image on a second side of the label 60. Then when a second label is printed, the first side of the second label can be printed with the same static image using the static printing process before retrieving the image for printing the second side of the label. As illustrated in the flow chart 30 in FIG. 5 the static part is printed on the first side of the label 39 and the variable part is changed, the image rasterized and printed 72 on the second side of the second label. This allows the first side of the label to be viewable at all times but the variable image is printed on the label of each container in such a way that the image is only viewable when the container is emptied of its contents if those contents are not transparent.

The use of the variable printed label is shown in HG. 12 with a plurality of beverage containers 80. A first container 82 has a first variable printed label 84 that contains a first image 86. A second container 92 has a second variable printed label 94 that contains a second image 96. This allows the fist and second image to be different in a specific way that can relate the two. The two images can be two members of a set such as important people, famous actors, endangered animals, poems or sayings from people or pictures from artists or photographers. Variable printed labels allow the images on each beverage container to have subtle or major changes from one container to the next.

While presently preferred embodiments have been described for purposes of this disclosure, numerous changes may be made some indicated above, which will readily suggest themselves to instill in the art, and which are encompassed in the spirit of the invention enclosed, and as defined in the amended claims.

What is claimed is:

1. A method of printing beverage labels comprising:

(a) printing a first side of a first label using a static printing process;

(b) forming an image for printing a second side of the first label, the image having a fixed part and a variable part;

(c) rasterizing the image;

(d) printing the rasterized image on the second side of the label;

(e) printing a first side of a second label using the static printing process;

(f) retrieving the image for printing the second side of the second label;

(g) changing the variable part;

(h) rasterizing the image; and (i) printing the rasterized image on the second side of the second label.

2. A method of printing a plurality of beverage labels comprising:

(a) storing a static image portion of the label;

(b) storing a plurality of variable image portions of the label;

(c) combining the static image portion of the label incrementally with each one of the variable image portions of the label to produce a plurality of combined label images;

(d) rasterizing each of the combined label images; and (e) printing each of the combined label images to produce the plurality of beverage labels having the static image portion common to each label and the variable image portion different from label to label.

3. Apparatus for printing a plurality of beverage labels comprising:

(a) a computer having memory storing a first static portion of an image and a plurality of second variable portions of an image;

(b) a rasterizer connected to the memory and combining the first static portion incrementally with each one of the second variable portions to form a plurality of combined label images for printing, each of the combined label images having the common image portion associated with a different variable image portion; and (c) a printer connected to the rasterizer for printing each of the combined label images.

4. The apparatus of claim 3 comprising a selector for selecting a variable portion to be combined with the static portion.

5. The apparatus of claim 4 further comprising a counter connected to the printer and the selector changing the variable portion after a preselected number of labels have been printed.

6. A method of producing a plurality of different beverage labels comprising:

(a) storing a static image portion and a plurality of variable image portions in a computer memory;

(b) combining the static image portion incrementally with each of the variable image portions to produce a plurality of combined label images that differ one from another;

(c) rasterizing each of the combined label images; and (d) printing each of the rasterized combined label images in a single pass to produce a plurality of labels, each of the label having the static image portion in common and a different variable image portion.

7. A method of printing a plurality of related beverage labels comprising:

(a) creating and storing a static portion of a beverage label;

(b) creating and storing a series of related variable portions of a beverage label;

(c) selecting one of the related variable portions of a beverage label; and (d) sequentially creating a plurality of related but different beverage labels by repeating steps of i) combining the stored static portion of the beverage label with the selected one of the variable portions of the beverage label ii) rasterizing the combined static portion and the selected variable portion to produce a composite beverage label and iii) printing the rasterized composite beverage label until a predetermined number of related beverage labels has been printed.

* * * * *